Patented Mar. 6, 1934

1,949,838

UNITED STATES PATENT OFFICE 1,949,838

OXIDATION PRODUCT OF SULPHUR-CONTAINING DERIVATIVES OF HIGHER FATTY ACIDS AND PROCESS OF MAKING SAME

Karl Keller, Frankfort - on - the - Main - Fechenheim, Germany, assignor to General Aniline Works, Inc., New York, N. Y., a corporation of Delaware No Drawing. Application May 12, 1931, Serial No. 536,946. In Germany June 20, 1930

6 Claims. (Cl. 260—112)

This invention relates to new oxidation products of sulphur containing derivatives of higher fatty acids and to a process of making same.

In U. S. application Serial No. 456,279, filed by Georg Kalischer and Karl Keller May 27, 1930, new derivatives of higher fatty acids containing sulphur are described, which are obtained by treating polyhalogenated fatty acids or their esters or amides or their conversion products containing more than 8 carbon atoms and at least 2 halogen atoms with solutions of soluble sulphides, hydrosulphides or polysulphides.

In accordance with my present invention these derivatives of higher fatty acids containing sulphur can be transformed into the corresponding disulphides or sulphonic acids by the oxidation process known per se, whereby in a surprising manner any halogen atoms and hydroxy groups present in the molecule of the initial products are not attacked. The fact that these groups are substantially present in the molecule of the oxidation products, confers a particular character on the said final products. When starting from unsaturated initial products in some cases the unsaturated character is retained also in the oxidation products, in other cases the acetyl value of the oxidation products is increased in comparison with that of the initial products and the final products are saturated.

For carrying out the oxidation agents usual for converting this class of products into disulphides and sulphonic acids (cf. Methoden der organischen Chemie, vol. VI, (1922), page 162 to 164) such as potassium permanganate, hydrogen peroxide, Caro's acid and hypochlorites are particularly suitable with or without the addition of a solvent or diluent. In some cases different oxidizing agents may be applied one after another in any suitable sequence.

In most cases the oxidation takes place in two phases. In the first stage products of disulphide type are formed, which products are soluble in alkalies but insoluble in acids and have soap like properties. They can be further oxidized with the formation of the corresponding sulphonic acids either by means of the same or of another suitable oxidizing agent.

On account of the presence of further substituents such as hydroxyl groups or halogen atoms and in some cases also of double bonds the products of the present invention are quite different in their behaviour from the sulphooleic acid, described by Benedikt and Ulzer, Zeitschrift der chem. Industrie 1887, page 298.

The products of the present invention in the form of their alkali salts are viscous oils easily soluble in water. The disulphide like products have a good cleansing and in some cases disinfecting power, the sulphonic acid compounds exhibit in addition to their cleansing effect a very good resistance to acids and lime and a protective power.

In order to further illustrate my invention the following examples are given, the parts being by weight and all temperatures in centigrade degrees, but it is however to be understood, that my invention is not limited to the particular products nor reacting conditions mentioned therein.

Example 1

70 parts of the sodium salt soap of about 30% strength of a stearic acid derivative, obtained by treating stearic acid dissolved in, for instance, carbon tetrachloride with chlorine at temperatures of about 70–85° C. until an increase of weight is obtained corresponding to the entrance of seven chlorine atoms into the molecule of stearic acid and treating the formed heptachlorstearic acid at 70–80° C. with sodium sulphide, which salt is of an unsaturated character and contains besides sulphur about 100 parts of hot water. While stirring at 30–100° 140 parts of a sodium hypochlorite solution containing about 21 parts of active chlorine are slowly added. When cool the sodium salt of the new compound separates as a yellowish oil. The two layers are separated. By evaporating and salting out the aqueous solution a further quantity of the sodium salt can be obtained. From the aqueous solution of the sodium salt the free acid can be isolated in the usual manner. It is still unsaturated and contains chlorine. Substantially all the sulphur is present in the disulphide form. The aqueous solutions of the alkalin salts have a strong cleansing effect.

On further oxidizing this product with for example potassium permanganate the corresponding sulphonic acid is obtained which exhibits a good resistance to acid and a protective power.

Example 2

50 parts of the sodium salt soap of about 50% strength of the derivative of ricinoleic acid, obtained by introducing at about 40–80° C. chlorine into ricinoleic acid until an increase of weight is obtained corresponding to the entrance of six chlorine atoms into the molecule of ricinoleic acid and treating the hexachloro-ricinoleic acid thus formed at about 115–120° with sodium sulphide which salt contains in addition to groups containing sulphur also hydroxy groups, a chlorine atom and double bonds, are dissolved in about 100 parts of hot water. Into this solution at a slow rate depending on the degree of decolorization a solution of 32 parts of potassium permanganate in about 250 parts of water is added while stirring at 24–30°. After stirring for some time the separated manganese peroxide is filtered off and the solution is evaporated to the desired concentration. The feebly coloured viscous solution thus obtained contains the oxidation product, which according to analysis still contains chlorine and sulphonic acid groups, has a higher acetyl value than the initial product and is practically saturated. The neutral solution of the new fatty acid derivative has a good resistance to acids and lime, a good cleansing effect and a good protective power.

Example 3

As starting material a product is used, which has been prepared in the following manner: pentachlorinated stearic acid, obtained by introducing a current of chlorine at about 70–85° C. into a solution of stearic acid in, for instance, carbon tetrachloride, until an increase of weight is obtained corresponding to the entrance of five chlorine atoms into the molecule of stearic acid, is gently heated with an aqueous caustic soda solution and the product thus obtained, which has a slightly unsaturated character and contains besides hydroxyl groups still two chlorine atoms, is heated for some hours in a closed vessel with an aqueous solution of sodium sulphide at temperatures of about 115–120°.

63 parts of the sodium salt thus obtained of a mercapto fatty acid of an unsaturated character, which still contains in its molecule about 1 chlorine atom besides hydroxyl-groups and about 1 mercapto-group, are dissolved in about 75 parts of hot water. While stirring a solution of 32 parts of potassium permanganate in about 250 parts of water is allowed to run in at 25–30°. Then the reaction mass is warmed for some time to about 40° and the separated manganese peroxide is removed by filtration. The filtrate is evaporated to the desired degree of concentration. In this manner a thinly liquid light yellow oil is obtainable which is clearly soluble in an acid as well as in an alkaline solution. The free sulphostearic compound is isolated from the aqueous solution in the usual manner.

The new compound is saturated and contains besides chlorine and hydroxyl groups one sulphonic acid groups. Its alkali metal salts are distinguished by a good cleansing and protective effect and a very good resistance to acids and lime.

Example 4

50 parts of the product obtained by heating a tetrachlorinated oleic acid, formed by introducing a current of chlorine at about 40–50° C. into a solution of oleic acid in, for instance, carbon tetrachloride, until an increase of weight is obtained corresponding to the entrance of four chlorine atoms into the molecule of oleic acid, for some hours in a closed vessel with a potassium hydrosulphide solution at 120–180°, which product contains about 20 parts of the potassium salt of an unsaturated dimercapto-oleic acid derivative, which is practically free from chlorine, are dissolved in about 100 parts of water. At about 40–50° while stirring a solution of 4 parts of hydrogen peroxide in about 20 parts of water is added. The reaction mass is stirred at about 50° for some time and the separated reaction product is isolated by filtration. In this manner about 20 parts of a brownish semisolid product are obtained which is clearly soluble in a dilute caustic soda solution. The new product which contains apparently two groups of the disulphide type is odorless in contradistinction to the starting material. It has a good disinfecting and cleansing effect.

When after treating this product with for instance potassium permanganate according to Example 2 the corresponding sulphonic acid is obtained, the alkali salts of which have a good protective effect and a good resistance to acids and lime.

Similar products of likewise valuable properties are obtained when subjecting to the same oxidation process sulphurized products obtained by starting from tetrachlorolauric or pentchloropalmitic acid or a halogen derivative of pelargonic acid.

I claim:

1. A process for producing new oxidation products of sulphur containing derivatives of higher fatty acids which process comprises treating with an oxidizing agent usual for converting mercapto compounds into disulphides and sulphonic acids a sulphur containing derivative of a fatty acid, containing more than 8 carbon atoms, which is obtained by heating a halogenated derivative of such a fatty acid containing at least 2 halogen atoms of the general formula $$C_nH_{2n+1-x-m}R_mHal_xCOOH,$$

wherein R means hydrogen or hydroxyl, $m$ the number 1 or 2, $n$ a number more than 7 and $x$ a number more than 2 obtained by direct halogenation of the corresponding carboxylic acid with the solution of a sulphurizing agent selected from the group consisting of alkali hydrosulphides, sulphides and polysulphides.

2. A process for producing new oxidation products of sulphur containing derivatives of higher fatty acids which process comprises treating with an oxidizing agent usual for converting mercapto compounds into disulphides and sulphonic acids, a sulphur containing derivative of a fatty acid, containing 18 carbon atoms, which is obtained by heating a halogenated derivative of such a fatty acid containing at least 2 halogen atoms of the general formula $C_{17}H_{35-x-m}R_mHal_xCOOH$, wherein R means hydrogen or hydroxyl $m$ the number 1 or 2 and $x$ a number more than 2 obtained by direct halogenation of the corresponding carboxylic acid with the solution of a sulphurizing agent selected from the group consisting of alkali hydrosulphides, sulphides, and polysulphides.

3. The oxidation products of sulphur containing derivatives of higher fatty acids, which products are in the form of their alkali metal salts viscous oils easily soluble in water, which products are obtained by treating with an oxidizing agent usual for converting mercapto compounds into disulphides and sulphonic acids a sulphur containing derivative of a fatty acid, containing more than 8 carbon atoms, which is obtained by heating a halogenated derivative of such a fatty acid containing at least 2 halogen atoms of the general formula $$C_nH_{2n+1-x-m}R_mHal_xCOOH,$$

wherein R means hydrogen or hydroxyl, $m$ the number 1 or 2, $n$ a number more than 7 and $x$ a number more than 2 obtained by direct halogenation of the corresponding carboxylic acid, with the solution of a sulphurizing agent selected from the group consisting of alkali hydrosulphides, sulphides and polysulphides.

4. The oxidation products of sulphur containing derivatives of higher fatty acids, which products are in the form of their alkali metal salts viscous oils easily soluble in water, which products are obtained by treating with an oxidizing agent usual for converting mercapto compounds into disulphides and sulphonic acids a sulphur containing derivative of a fatty acid, containing 18 carbon atoms, which is obtained by heating a halogenated derivative of such a fatty acid containing at least 2 halogen atoms of the general formula $$C_{17}H_{35-x-m}R_mHal_xCOOH,$$

wherein R means hydrogen or hydroxyl $m$ the number 1 or 2 and $x$ a number more than 2 obtained by direct halogenation of the corresponding carboxylic acid with the solution of a sulphurizing agent selected from the group consisting of alkali hydrosulphides, sulphides and polysulphides.

5. Derivatives of higher fatty acids, containing sulphonic acid groups, the alkali metal salts of which are viscous oils easily soluble in water and distinguished by a good cleansing and protective effect and a good resistance to acids and lime, which products are obtained by treating with an oxidizing agent usual for converting mercapto compounds into sulphonic acids until the formation of sulphonic acid groups a sulphur containing derivative of a fatty acid, containing 18 carbon atoms, which is obtained by heating a halogenated derivative of such a fatty acid containing at least 2 halogen atoms of the general formula $$C_{17}H_{35-x-m}R_mHal_xCOOH,$$

wherein R means hydrogen or hydroxyl, $m$ the number 1 or 2 and $x$ a number more than 2 obtained by direct halogenation of the corresponding carboxylic acid with the solution of a sulphurizing agent selected from the group consisting of alkali hydrosulphides, sulphides and polysulphides.

6. The derivative of ricinoleic acid containing a sulphonic acid group, the alkali metal salts of which are viscous oils easily soluble in water and distinguished by a good cleansing and protective effect and a good resistance to acids and lime, which product is obtained by treating with an oxidizing agent usual for converting mercapto compounds into sulphonic acids until the formation of sulphonic acid groups the sulphurization product obtained by heating hexachloro-ricinoleic acid of the formula $C_{17}H_{28}(OH)Cl_6COOH$ obtained by direct halogenation of the corresponding carboxylic acid with a sodium sulphide solution.

KARL KELLER.